United States Patent Office 3,254,124
Patented May 31, 1966

3,254,124
AMINOKETONES AND METHODS FOR
THEIR PRODUCTION
Calvin L. Stevens, Detroit, Mich., assignor to Parke, Davis
and Company, Detroit, Mich., a corporation of Michigan
No Drawing. Filed June 29, 1962, Ser. No. 206,188
12 Claims. (Cl. 260—570.5)

This application is a continuation-in-part of my earlier filed United States application Serial Number 127,868, filed July 31, 1961, for Process for the Preparation of Aminoketones, now abandoned.

This invention relates to novel aminoketones, to acid-addition salts thereof, and to methods for producing the same. More particularly, the invention relates to α-aminoketones which in free base form have the formula

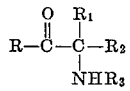

wherein R, $R_1$, and $R_3$ are selected from among lower alkyl groups containing 1 to 5 carbon atoms inclusive, lower aryl groups such as phenyl and substituted phenyl moieties, and groups wherein any one of R, $R_1$, and $R_2$ may be combined to form an alkylene bridge of from 4 to 5 carbon atoms inclusive.

The free bases of the invention form acid addition salts by reaction with any number of acids. Non-toxic, pharmaceutically acceptable acid addition salts are formed with acids such as a hydrochloric, hydrobromic, hydriodic, sulfuric, phosphoric, acetic, citric, tartaric, and p-toluene sulfonic acids. These acid addition salts are converted to the free bases by treatment with a base such as sodium hydroxide or sodium carbonate.

Generally speaking, α-aminoketones are sparsely known in the prior art. This is because of the difficulties which are encountered in attempting to prepare such compounds.

An object of this invention is to provide novel α-aminoketones.

Another object of this invention is to provide a method for producing α-aminoketones from α-hydroxyketones by a rearrangement of the carbon skeleton of the hydroxyketone.

A further object of this invention is to provide a method for rearranging more available α-aminoketones to get different more difficultly available α-aminoketones.

These and other objects which will appear hereinafter are realized by heating compounds of the general formula

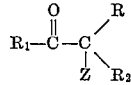

either alone or in the presence of at least one equivalent of an amine of the formula $R_3NH_2$ wherein R, $R_1$, $R_2$, and $R_3$ are as defined earlier and wherein Z represents —OH or —$NHR_3$. When Z is —OH, at least one equivalent of the amine, $R_3NH_2$, should be used.

In carrying out the process of this invention with a compound of the formula,

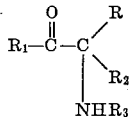

where R, $R_1$, $R_2$, and $R_3$ are as defined earlier, I have found that the rearrangement proceeds between the temperatures of 180 and 250° C. Preferably, I use a temperature of between 210 and 230° C. The starting material is heated in a sealed vessel of some type, usually in a pressure bomb or in a sealed glass tube, for between 10 and 20 hours. Preferably, the reaction time is limited to 12 hours ±2 hours. While the α-aminoketone pictured above can be rearranged when it is heated alone, I have also found that an amine of the formula $R_3NH_2$ (the same amine that is present in the starting α-aminoketone) can be used as a solvent for this pressure reaction. Preferably, the α-aminoketone is heated alone.

In carrying out the novel rearrangement of this invention by heating a compound of the formula

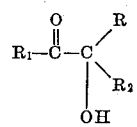

with an amine of the formula $R_3NH_2$ wherein R, $R_1$, $R_2$, and $R_3$ are as defined earlier, I have found that, although equivalent amounts of the α-hydroxyketone and the amine will give the desired α-aminoketone, a 2 to 3-fold excess of amine is to be preferred. At least one equivalent of the amine should be used. The heating is carried out in a sealed vessel for between 10 and 20 hours (preferably 12 hours ±2 hours) at a temperature of between 180 and 250° C. (preferably 210 to 230° C.).

If desired, the intermediate α-hydroxyimine from the above reaction can be isolated. It has the formula

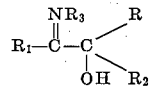

wherein R, $R_1$, $R_2$, and $R_3$ are as defined earlier. The α-hydroxyimines can then be rearranged to the desired α-aminoketones by heating in a solvent, preferably Decalin, at about 180 to 250° C. (preferably 185–200° C.). It is also possible to prepare the above α-hydroxyimines by reacting an amine of formula $R_3NH_2$ with a bromoketone of the formula

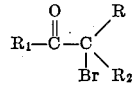

wherein R, $R_1$, $R_2$, and $R_3$ are as defined above.

As mentioned earlier, the processes of this invention involve a rearrangement of the carbon skeleton of the starting material. In fact, a skeletal-rearrangement always takes place when the above-described processes are carried out. This rearrangement can manifest itself in a simple alkyl or aryl migration or it can result in either ring expansion or ring contraction. In fact, if any two of R, $R_1$, and $R_2$ are combined to form a ring in the starting material, the final product will contain a ring of a different size. The following examples will show the various rearrangements which can take place:

(1) Alkyl-aryl migration:

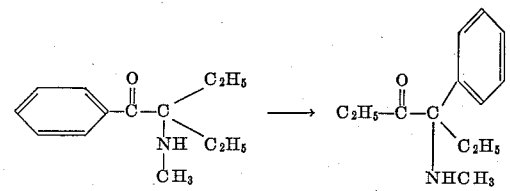

(2) Aryl-alkyl migration:

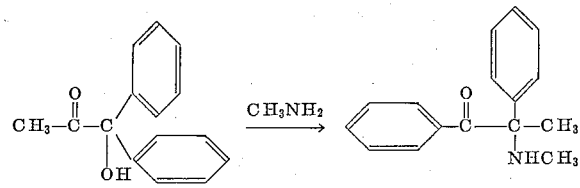

(3) Ring contraction:

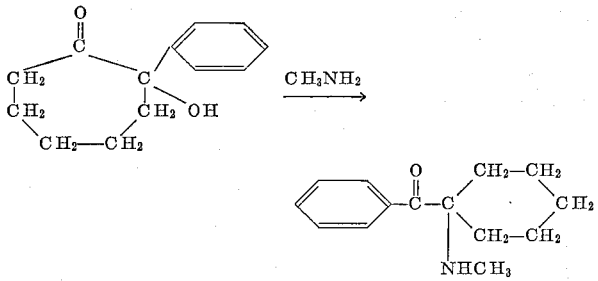

(4) Ring expansion:

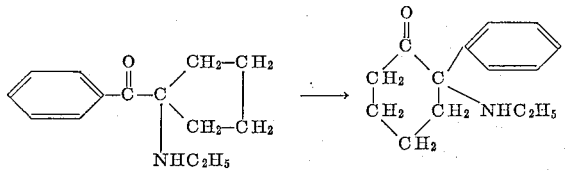

(5) Ring expansion:

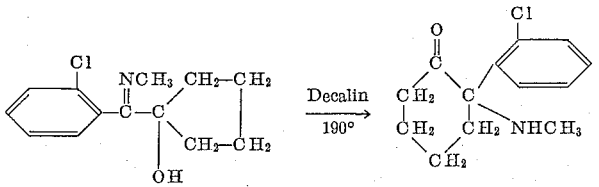

The α-aminoketones which can be prepared according to the present invention are useful as chemical intermediates. For example, it is possible to reduce the ketone group to a hydroxyl group via standard chemical procedures to produce α-aminoalcohols. Additionally, the α-aminoketones described herein have central nervous system activity. Specifically, 3-methylamino-3-phenyl-2-butanone has analeptic activity and 4-methylamino-4-phenyl-3-hexanone has anti-convulsant activity. α-Methylamino-α-methylcyclohexanone also has central nervous system activity. Further, 1-methylaminocyclohexylphenylketone can be converted via standard chemical procedures well known in the art to its oxime (M.P. 145–146° C.) which has central nervous system activity.

Of particular importance to this invention because of their cataleptoid activity are those compounds of the formula

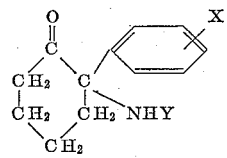

wherein X is selected from among hydrogen, halogen, hydroxy, methyl and methoxy and Y represents a lower alkyl group containing 1 to 5 carbon atoms inclusive. Those compounds wherein Y is methyl or ethyl are exceptionally good and α-methylamino-α-phenylcyclohexanone and α-ethylamino-α-phenylcyclohexanone are particularly good cataleptoid agents.

*Example 1*

α-Hydroxyphenylcyclohexylketone (10.0 g.) is heated at 200° C. in a steel bomb with excess aniline for 15 hours. Upon evaporation of the reaction mixture to dryness α-anilino-α-phenylcycloheptanone remains; M.P. 136–138° C. An analytical sample is prepared by recrystallization from ether-petroleum ether.

*Example 2*

A sealed tube containing 1.83 g. (0.0089 mole) of 2-ethyl-2-methylaminobutyrophenone is placed in an autoclave and surrounded with 15 ml. of toluene to counteract any pressure which might develop in the tube. The autoclave is heated at 250° C. for ten hours. The product, after flash distillation, is dissolved in dilute hydrochloric acid and washed with ether. The acid solution is made basic and extracted with ether. The ether layer is dried and the ether removed in vacuo. The residue is microdistilled to give a pale yellow liquid whose infrared spectrum shows strong absorption at 1730 cm.$^{-1}$. The crude 4-methylamino-4-phenyl-3-hexanone is isolated as its hydrochloride. The precipitated hydrochloride is recrystallized from ethanol and ether to give colorless crystals; M.P. 209–210° C. Recrystallization provided an analytical sample; M.P. 210.5–211° C.

A portion of the 4-methylamino-4-phenyl-3-hexanone hydrochloride is converted to the free amine; B.P. 60–65° C. (0.03 mm.), $n_D^{28.5}$ 1.5135, $d^{25}$ 0.9972.

The conjugated α-aminoketone used as starting material is prepared as follows: A steel autoclave containing 15.8 g. (0.08 mole) of 1,2-epoxy-2-ethyl-1-methoxy-1-phenylbutane and 60 ml. of methylamine is heated at 140° C. for twelve hours. After excess methylamine is evaporated, the residue is heated with 30 ml. of 3 N hydrochloric acid. The resulting solution is dried, the ether evaporated and the residue distilled to give 2-ethyl-2-methylaminobutyrophenone; B.P. 4–76° C. (0.12 mm.), $n_D^{25}$ 1.5227.

*Example 3*

2-ethyl-2-hydroxybutyrophenone is placed in an autoclave with excess methylamine and heated at 240° C. for fourteen hours. From the reaction mixture 4-methylamino-4-phenyl-3-hexanone can be isolated as its hydrochloride; M.P. 208–210° C.

*Example 4*

A sealed tube containing 2.31 g. (0.0114 mole) of 1-methylaminocyclopentylphenylketone is heated at 220° C. for ten hours. Using the previously described isolation method of Example 2, 2-methylamino-2-phenylcyclohexanone is isolated as its hydrochloride; M.P. 256° C. The 1-methylaminocyclopentylphenylketone used in the above reaction is prepared as follows: Cyclopentylphenylketone is brominated to give 1-bromocyclopentylphenylketone; M.P. 29–30° C. Treatment of the bromoketone with dry sodium methoxide gives 96% of 2-methoxy-2-phenyl-1-oxaspiro [2.4] heptane; B.P. 62–64° C. (0.05 mm.), $n_D^{25}$ 1.5136. The epoxyether is treated with excess methylamine at 130° C. for ten hours in an autoclave to give 57% of 1-methylaminocyclopentylphenylketone; B.P. 74–76° C. (0.03 mm.), $n_D^{29}$ 1.5441.

*Example 5*

A sealed tube containing 5.0 g. (0.026 mole) of 2-methyl-2-methylaminobutyrophenone is heated at 185° C. for ten hours and worked up using the procedure followed in Example 2. From the reaction is isolated crude 2-methylamino-2-phenyl-3-pentanone; B.P. 59–60° C. (0.1 mm.). The aminoketone is converted to the hydrochloride and crystallized from ethanol-ether to give white crystals; M.P. 192–193° C. The 2-methyl-2-methylaminobutyrophenone used in the above reaction is prepared as follows: α-bromo-α-methylbutyrophenone is converted in 97% yield to 1,2-epoxy-1-methoxy-2-methyl-1-phenylbutane using sodium methoxide in methanol. The epoxyether has B.P. 49° C. (0.1 mm.), $n_D^{26}$ 1.4890. The epoxyether is converted to 2-methyl-2-methylaminobutyrophenone in 66% yield using excess methylamine in a steel bomb at 150° C. for ten hours. The aminoketone has B.P. 94° C. (0.45 mm.), $n_D^{26}$ 1.5212.

Example 6

A sealed tube containing 1.22 g. (0.0069 mole) of 2-methyl-2-methyl-aminopropiophenone is heated at 240° C. for ten hours. Isolation of the basic fraction by the procedure of Example 2 gives aminoketone. An infrared spectrum of this product shows absorption at 1685 cm.$^{-1}$ and 1725 cm.$^{-1}$ of approximately equal intensity, indicating a possible mixture of conjugated and unconjugated aminoketones. Repeated crystallization of the hydrochloride of this mixture raises the melting point to 198–201° C. and an infrared spectrum of this product indicates chiefly unconjugated carbonyl. Further crystallization gives pure 3-methylamino-3-phenyl-2-butanone hydrochloride; M.P. 213.5° C. The 2-methyl-2-methylaminopropiophenone used in the above reaction is prepared as follows: Treatment with excess methylamine at 150° C. for twenty-four hours in a sealed tube converts 1,2-epoxy-1-methoxy-2-methyl-1-phenylpropane in 58% yield into 2-methyl-2-methylaminopropiophenone; B.P. 70–71° C. (0.3 mm.), $n_D^{25}$ 1.5246.

Example 7

Six-tenths of a gram (0.0027 mole) of 1,1-diphenyl-1-hydroxy-2-propanone and 5 ml. of methylamine are sealed in a Pyrex tube and placed in an autoclave with 50 ml. of toluene to counteract any pressure which develops in the sealed tube. The autoclave is heated at 200° C. for ten hours and 2-methylamino-2-phenylpropiophenone is isolated as the hydrochloride; M.P. 215.5–216°. An infrared spectrum of the aminoketone shows only conjugated carbonyl group absorption.

Example 8

In a bomb is placed 24.31 g. of freshly distilled α-methylaminocyclopentylmethylketone. This is heated at 215° C. for ten hours, cooled, taken up in ether and extracted with dilute acid. The acid layer is made basic and extracted with ether and methylene chloride. The solution is dried and the residue fractionally distilled to give 2-methylamino-2-methylcyclohexanone; B.P. 55–57° C. (2 mm.), $n_D^{25}$ 1.4710. The free α-aminoketone is then converted to 2-methylamino-2-methylcyclohexanone hydrochloride; M.P. 188–190° C. An analytical sample is prepared by recrystallization from acetone; M.P. 191.4–191.8, pKa (50% CH$_3$OH)=8.40.

The starting α-methylaminocyclopentylmethylketone used in the above reaction is prepared as follows: Cyclopentylmethylketone is brominated with N-bromosuccinimide to give 77% of 2-bromocyclophenylmethylketone; B.P. 75–77° C. (8 mm.), $n_D^{25}$ 1.4900, which, when treated with excess methylamine in benzene solution for four days at room temperature, gives 76% of 2-methylaminocyclopentylmethylketone; B.P. 49–50° C. (1.5 mm.), $n_D^{25}$ 1.4642. The hydrochloride melts at 117–119° C.

Example 9

A sealed tube containing 2.7 g. 4-hydroxy-4-phenyl-3-hexanone is heated with excess methylamine at 200° C. for ten hours. From this reaction mixture 4-methylamino-4-phenyl-3-hexanone is isolated as the hydrochloride; M.P. 211–212° C.

The 4-hydroxy-4-phenyl-3-hexanone used as starting material in the above reaction can be prepared as follows: 2-ethyl-2-hydroxybutyrophenone is dissolved in anhydrous ether, a 5 to 6-fold excess of finely pulverized anhydrous potassium hydroxide is added, the mixture is stirred for 1 to 2 hours, and then poured over ice. The ether layer is separated, dried over anhydrous sodium sulfate, evaporated to dryness, and the 4-hydroxy-4-phenyl-3-hexanone distilled; B.P. 67° C. (0.22 mm.).

Example 10

Five grams (0.030 mole) of 3-hydroxy-3-phenyl-2-butanone and 25 ml. of methylamine are heated in an autoclave at 200° C. for ten hours. Using the procedure of Example 2, 3-methylamino-3-phenyl-2-butanone is obtained as the hydrochloride; M.P. 211–212° C. Recrystallization from ethanol-ether gives an analytical sample; M.P. 213.5° C.

Example 11

When 2-hydroxy-2-phenylcycloheptanone is heated in a steel bomb at 200° C. with excess methylamine for 15 hours, α-methylaminophenylcyclohexylketone is isolated; B.P. 104–106° C. (0.09 mm.), $n_D^{27}$ 1.5438; M.P. of hydrochloride 225–226° C.

Example 12

α-Ethylaminophenylcyclopentylketone (10.0 g.) is heated at 230° C. for twenty hours in the presence of excess ethylamine. From the reaction mixture, 2-ethylamino-2-phenylcyclohexanone is isolated; B.P. 108–109° C. (0.5 mm.), $n_D^{25}$ 1.5373.

α-Ethylaminocyclophentylphenylketone used in the above reaction is prepared as follows: 2-methoxy-2-phenyl-1-oxaspiro[2.4]-heptane (10.0 g.) is treated with excess ethylamine at 130° C. for ten hours in an autoclave to give α-ethylaminocyclopentylphenylketone; B.P. 94° C. (0.1 mm.), $n_D^{25}$ 1.5325; M.P. of hydrochloride, 183° C.

Example 13

1 - hydroxycyclopentylphenylketone N - methylimine (2.95 g.) is rearranged by refluxing in 30 ml. of Decalin for 2 hours. Addition of an isopropanolic hydrochloric acid solution to the reaction mixture gives crude 2-methylamino-2-phenylcyclohexanone hydrochloride. Recrystallization from ethanol-ether gives pure 2-methylamino-2-phenylcyclohexanone hydrochloride, M.P. 255–257°.

2-methylamino-2-phenylcyclohexanol is prepared by sodium borohydride reduction of the parent aminoketone. The aminoalcohol hydrochloride has M.P. 232° C.

1-hydroxycyclopentylphenylketone N-methylimine used in the above reaction is prepared as follows: 1-bromocyclopentylphenylketone (12.0 g.) is treated with 30 ml. of liquid methylamine and the reaction allowed to come to room temperature over a one hour period. Ether (50 ml.) is added to the reaction mixture, the methylamine hydrobromide is removed, and the ether evaporated to leave 1-hydroxycyclopentylphenylketone N-methylimine, M.P. 72–74°.

Example 14

1-hydroxycyclophentylphenylketone (10.0 g.) is dissolved in an excess of liquid methylamine and the solution is heated in an autoclave at 200° for 5 hours. Ether (50 ml.) is then added and the ether solution is extracted three times with three 50 ml. portions of 6 N hydrochloric acid. Evaporation of the acid solution leaves 2-methylamino-2-phenylcyclohexanone as its hydrochloride, M.P. 255–256°, after crystallization from ethanol-ether.

The free-base, 2-methylamino-2-phenylcyclohexanone, can be isolated by neutralizing its hydrochloride salt with dilute sodium hydroxide, extracting with ether and removing the ether.

Addition of sufficient sulfuric acid to neutralize 2-methylamino-2-phenylcyclohexanone gives 2-methylamino-2-phenylcyclohexanone sulfate.

If citric acid is used in place of sulfuric acid, the product is 2-methylamino-2-phenylcyclohexanone citrate.

If acetic acid is used in place of sulfuric acid, the product is 2-methylamino-2-phenylcyclohexanone acetate.

If p-toluene sulfonic acid is used in place of sulfuric acid, the product is 2-methylamino-2-phenylcyclohexanone p-toluene sulfonate.

Example 15

1-hydroxycyclopentyl-(o-chlorophenyl)-ketone N-methylimine (2.0 g.) is dissolved in 15 ml. of Decalin and refluxed for two and one-half hours. After evaporation of the Decalin under reduced pressure, the residue is extracted with dilute hydrochloric acid, the solution treated with decolorizing charcoal, and the resulting acidic solution is made basic. The liberated product, 2-methylamino-2-(o-chlorophenyl)-cyclohexanone, after crystallization from pentane-ether, has M.P. 92–93° C. The hydrochloride of this compound has M.P. 262–263°.

The 1-hydroxycyclopentyl-(o-chlorophenyl)-ketone N-methylimine used in the above reaction is prepared as follows: To the Grignard reagent prepared from 119.0 g. of cyclopentylbromide and 19.4 g. of magnesium is added 55.2 g. of o-chlorobenzonitrile. The reaction mixture is stirred for three days and thereafter hydrolyzed in the usual manner. From the hydrolysis there is obtained o-chlorophenylcyclopentylketone, B.P. 96–97° (0.3 mm.), $n_D^{25}$ 1.5452. To 21.0 g. of the ketone is added 10.0 g. of bromine in 80 ml. of carbon tetrachloride. 1-bromocyclopentyl-(o-chlorophenyl)-ketone, B.P. 111–114° (0.1 mm.) is isolated in the usual manner. Since it is unstable, it must be used immediately. The bromoketone (29.0 g.) is dissolved in 50 ml. of liquid methylamine. After one hour, the excess liquid methylamine is allowed to evaporate. The organic residue is dissolved in pentane, and upon evaporation of the solvent, 1-hydroxycyclopentyl-(o-chlorophenyl) - ketone N-methylimine, M.P. 62°, is isolated.

If instead of rearranging 1-hydroxycyclopentyl-(o-chlorophenyl)-ketone N-methylimine one heats 1-hydroxycyclopentyl - (p-chlorophenyl) - ketone N - methylimine in Decalin, the product which results is 2-methylamino-2-(p-chlorophenyl) - cyclohexanone. The hydrochloride of this aminoketone has M.P. 221–222° C.

The 1-hydroxycyclopentyl-(p-chlorophenyl)-ketone N-methylimine used as starting material in the preparation of 2-methylamino-2-(p-chlorophenyl)-cyclohexanone is prepared in the same manner as 1-hydroxycyclopentyl-(o-chlorophenyl)-ketone N-methylimine. Cyclopentyl-(p-chlorophenyl)-ketone is brominated to give 1-bromocyclopentyl-(p-chlorophenyl)-ketone, M.P. 57–58°. The bromoketone, upon treatment with liquid methylamine, gives 2-hydroxycyclopentyl-(p-chlorophenyl)-ketone N-methylimine, M.P. 64–65°.

If one rearranges 1-hydroxycyclopentyl-(m-chlorophenyl)-ketone N-methylimine instead of 1-hydroxycyclopentyl-(o-chlorophenyl)-ketone N-methylimine, the product of the rearrangement is 2-methylamino-2-(m-chlorophenyl)-cyclohexanone.

The hydroxycyclopentyl-(m-chlorophenyl)-ketone N-methylimine used as starting material is prepared in a manner similar to that described above for 1-hydroxycyclopentyl-(o-chlorophenyl)-ketone N-methylimine and 1-hydroxycyclopentyl(p-chlorophenyl)-ketone N-methylimine. Cyclopentyl-(m-chlorophenyl)-ketone is brominated to give 1-bromocyclopentyl-(m-chlorophenyl)-ketone. The bromoketone, upon treatment with liquid methylamine, gives 2-hydroxycyclopentyl - (m - chlorophenyl)-ketone N-methylimine.

*Example 16*

1-ethylaminocyclopentyl-(p-methylphenyl)ketone (10.0 g.) is heated at 230° for eight hours in an autoclave in the presence of excess ethylamine. The product, after flash distillation, is dissolved in dilute hydrochloric acid and washed with ether. The acid solution is made basic with dilute sodium hydroxide and extracted with ether. The ether layer is dried over sodium sulfate, the sodium sulfate removed, and the ether evaporated in vacuo. The residue is then distilled to give 2-ethylamino-2-(p-methylphenyl)-cyclohexanone. The free base is dissolved in ether and precipitated as its hydrochloride, M.P. 234–235° C.

The 1-ethylaminocyclopentyl-(p-methylphenyl)-ketone used in the above reaction is prepared as follows: Cyclopentyl-(p-methylphenyl)-ketone is brominated in the usual manner to give 1-bromocyclopentyl-(p-methylphenyl)-ketone, B.P. 114° (0.01 mm.), $n_D^{25}$ 1.5724. Treatment of the bromoketone with dry sodium methoxide gives the epoxyether, 2-methoxy-2-(p-methylphenyl) - 1 - oxaspiro [2.4] heptane, B.P. 64° (0.1 mm.). The epoxyether is treated with excess ethylamine in an autoclave at 130° for 10 hours to give 1-ethylaminocyclopentyl-(p-methylphenyl)-ketone, B.P. 96° (0.07 mm.). This ketone is converted to its hydrochloride, M.P. 196–197°, in the usual manner.

If the epoxyether described in paragraph two of this example is treated with excess propylamine instead of ethylamine, the resulting product is 1-propylaminocyclopentyl-(p-methylphenyl)-ketone. This product can then be rearranged as described in the first paragraph of this example to give 2-propylamino-2-(p-methylphenyl)-cyclohexanone.

If the epoxyether is treated with excess butylamine instead of ethylamine, the resulting product is 1-butylaminocyclopentyl-(p-methylphenyl)-ketone. This product can be rearranged as described in the first paragraph of this example to give 2-butylamino-2-(p-methylphenyl)-cyclohexanone.

If the epoxyether is treated with excess pentylamine instead of ethylamine, the resulting product is 1-pentylaminocyclopentyl-(p-methylphenyl)-ketone. This product can then be rearranged as described in the first paragraph of this example to give 2-pentylamino-2-(p-methylphenyl)-cyclohexanone.

If one rearranges 1-methylaminocyclopentyl-(o-methylphenyl)-ketone instead of 1-ethylaminocyclopentyl-(p-methylphenyl)-ketone, the resulting product is 2-methylamino-2-(o-methylphenyl)-cyclohexanone. This compound easily forms a hydrochloride, M.P. 263–264°.

The 1-methylaminocyclopentyl - (o-methylphenyl)-ketone used as starting material is prepared as follows: o-Methylphenylcyclopentylketone is brominated to give 1-bromocyclopentyl - (o-methylphenyl)-ketone. Although unstable, this bromoketone can be evaporatively distilled at 0.005 mm., bath temperature 90–95°, to give an analytically pure sample. Treatment of the bromoketone with dry sodium methoxide gives 2-methoxy-2-(o-methylphenyl)-1-oxaspiro[2.4]heptane. Treatment of the epoxyether with excess methylamine in an autoclave at 130° for 10 hours gives 1-methylaminocyclopentyl-(o-methylphenyl)-ketone. The hydrochloride of this compound is prepared in the usual manner and has M.P. 161–162° C.

If one rearranges 1-isopropylaminocyclopentylphenylketone instead of 1-ethylaminocyclopentyl - (p-methylphenyl)-ketone, the resulting product is 2-isopropylamino-2-phenylcyclohexanone. The hydrochloride of 2-isopropylamino-2-phenylcyclohexanone is formed in the usual manner.

The 1-isopropylaminocyclopentylphenylketone used as starting material is prepared by treating 2-methoxy-2-phenyl-1-oxaspiro[2.4]heptane (10.0 g.) with excess isopropylamnie in an autoclave at 130° for 20 hours.

If 2-methoxy-2-phenyl-1-oxaspiro[2.4]heptane is reacted with n-butylamine in an autoclave at 130° for 15 hours, 1-butylaminocyclopentylphenylketone is obtained. This aminoketone is rearranged by the procedure given in paragraph 1 of this example to give 2-butylamino-2-phenylcyclohexanone. The hydrochloride of 2-butylamino-2-phenylcyclohexanone is formed in the usual manner.

If one rearranges 1-isopropylaminocyclopentyl - (m-methylphenyl)-ketone instead of 1-ethylaminocyclopentyl-(p-methylphenyl)-ketone, the product obtained is 1-isopropylamino-2-(m-methylphenyl)-cyclohexanone.

The 1-isoproplylaminocyclopentyl - (m-methylphenyl)-ketone used as starting material in the above reaction is prepared as follows: m-Methylphenylcyclopentylketone is brominated to give 1-bromocyclopentyl-(m-methylphenyl)-ketone. Treatment of the bromoketone with dry sodium methoxide gives 2-methoxy-2-(m-methylphenyl)-1-oxaspiro[2.4]heptane. The epoxyether is treated with excess isopropylamine in an autoclave at 130° for 20 hours to give 1-isopropylaminocyclopentyl-(m-methylphenyl)-ketone.

If one rearranges 1-methylaminocyclopentyl-(p-methoxyphenyl)-ketone instead of 1-ethylaminocyclopentyl-(p-methylphenyl)-ketone, the product obtained is 2-methylamino-2-(p-methoxyphenyl)-cyclohexanone, whose hydrochloride has M.P. 216–218° C. This aminoketone can subsequently be reduced to 2-methylamino-2-(p-methoxyphenyl)-cyclohexanol, M.P. 107–117°.

The 1-methylaminocyclopentyl - (p-methoxyphenyl)-ketone used as starting material in the above reaction is prepared as follows: p-Methoxyphenylcyclopentylketone is brominated to give 1-bromocyclopentyl-(p-methoxyphenyl)-ketone, M.P. 36–36.5° C. It is also possible to chlorinate p-methoxyphenylcyclopentylketone in a similar manner to get 1-chlorocyclopentyl-(p-methoxyphenyl)-ketone, M.P. 37–38° C. Treatment of either the bromoketone or chloroketone with dry sodium methoxide gives 2 - methoxy-2-(p-methoxphenyl)-1-oxaspiro[2.4]heptane, B.P. 90–91° C. (0.1 mm.), $n_D^{25}$ 1.5237, M.P. 45–48° C. Treatment of the epoxyether with excess methylamine in an autoclave at 130° for 10 hours gives 1-methylaminocyclopentyl - (p-methoxyphenyl) - ketone, B.P. 115–116° (0.1 mm.), $n_D^{25}$ 1.5565. The hydrochloride of this aminoketone has M.P. 167–168° C.

If 1-methylaminocyclopentyl-(p-chlorophenyl)-ketone is rearranged instead of 1-ethylaminocyclopentyl-(p-methylphenyl)-ketone, the product obtained is 2-methylamino-2-(p-chlorophenyl)-cyclohexanone whose hydrochloride has M.P. 221–222° C.

1 - methylaminocyclopentyl - (p-chlorophenyl)-ketone used as starting material in the above reaction is prepared as follows: p-chlorophenylcyclopentylketone is brominated to give 1-bromocyclopentyl-(p-chlorophenyl)-ketone, M.P. 57–58° C. Treatment of the bromoketone with dry sodium methoxide gives 2-methoxy-2-(p-chlorophenyl)-1-oxaspiro[2.4]heptane, B.P. 82° (0.2 mm.), $n_D^{25}$ 1.5623. Treatment of the epoxyether with excess methylamine in an autoclave at 130° for 10 hours gives 1 - methylaminocyclopentyl - (p-chlorophenyl)-ketone, whose hydrochloride has M.P. 153–155°.

*Example 17*

1 - hydroxycyclopentyl-(p-methoxyphenyl)-ketone N-methylimine (10.0 g.) is rearranged by refluxing in 30 ml. of Decalin for 2 hours. Addition of isopropanolic hydrogen chloride to the reaction mixture gives crude 2-methylamino-2-(p-methoxyphenyl)-cyclohexanone hydrochloride, M.P. 216–218° C. This aminoketone can easily be reduced to the corresponding 2-methylamino-2-(p-methoxyphenyl)-cyclohexanol, M.P. 107–117° C. using an alcoholic solution of sodium borohydride.

The starting material, namely 1-hydroxycyclopentyl-(p-methoxyphenyl)-ketone N-methylimine, is prepared as follows: p-methoxyphenylcyclopentylketone is brominated to give 1-bromocyclopentyl-(p-methoxyphenyl)-ketone, M.P. 36–36.5° C. Treatment of the bromoketone (12.0 g.) with 30 ml. of liquid methylamine for one hour, followed by evaporation of the liquid methylamine, solution of the organic residue in pentane, and subsequent evaporation of the solvent gives 1-hydroxycyclopentyl-(p-methoxyphenyl)-ketone N-methylimine, M.P. 38–39° C.

When 1-hydroxycyclopentyl-(o-methoxyphenyl)-ketone N-methylimine is rearranged in place of 1-hydroxycyclopentyl-(p-methoxyphenyl)-ketone N-methylimine, the resulting product is 2-methylamino-2-(o-methoxyphenyl)-cyclohexanone, whose hydrochloride has M.P. 211–212° C.

The starting 1-hydroxycyclopentyl-(o-methoxyphenyl)-ketone N-methylimine used in the above reaction is prepared as follows: o-Methoxyphenylcyclopentylketone is brominated to give 1-bromocyclopentyl-(o-methoxyphenyl)-ketone, M.P. 26–27° C. The bromoketone is then treated with excess liquid methylamine as described in paragraph two of this example and 1-hydroxycyclopentyl-(o-methoxyphenyl)-ketone N-methylimine, M.P. 78–79° C., is isolated.

If one rearranges 1-hydroxycyclopentyl-(m-methoxyphenyl)-ketone N-methylimine instead of 1-hydroxycyclopentyl-(p-methoxyphenyl)-ketone N-methylimine, the product obtained is 2-methylamino-2-(m-methoxyphenyl)-cyclohexanone.

The starting 1-hydroxycyclopentyl-(m-methoxyphenyl)-ketone N-methylimine is prepared as follows: m-Methoxyphenylcyclopentylketone is brominated to give 1 - bromocyclopentyl-(m-methoxyphenyl)-ketone. The bromoketone is then treated, as described above, with an excess of methylamine to give 1-hydroxycyclopentyl-(m-methoxyphenyl)-ketone N-methylimine.

If 1-hydroxycyclopentyl-(o-methylphenyl)-ketone N-methylimine is rearranged instead of 1-hydroxycyclopentyl-(p-methoxyphenyl)-ketone N-methylimine, the product isolated is 2-methylamino-2-(o-methylphenyl)-cyclohexanone, whose hydrochloride has M.P. 263–264° C.

The starting iminoalcohol is prepared as follows: o-Methylphenylcyclopentylketone is brominated to give 1-bromocyclopentyl-(o-methylphenyl)-ketone. Treatment of the bromoketone with excess methylamine, as described above, gives 1-hydroxycyclopentyl-(o-methylphenyl)-ketone N-methylimine.

*Example 18*

2 - methylamino-2-(o-benzyloxyphenyl)-cyclohexanone (1.0 g.) is refluxed for three hours with 16 ml. of 4 N hydrochloric acid solution. Evaporation of the solvent followed by neutralization with 6 N sodium hydroxide and extraction with ether gives an etheral solution of 2-methylamino-2-(o-hydroxyphenyl)-cyclohexanone. Removal of the ether gives the pure cyclohexanone. This compound can exist both in the keto form and as the closed hemiacetal compound.

The 2-methylamino-2-(o-benzyloxyphenyl)-cyclohexanone used as starting material in this reaction is prepared as follows: o-Benzyloxyphenylcyclopentylketone is brominated to give 1-bromocyclopentyl-(o-benzyloxyphenyl)-ketone. Treatment of the bromoketone with excess liquid methylamine followed by isolation as described in Example 17 affords 1-hydroxycyclopentyl-(o-benzyloxyphenyl)-ketone N-methylimine. Refluxing this iminoalcohol (10.0 g.) in 50 ml. of Decalin for two hours followed by evaporation of the Decalin under reduced pressure, extraction of the residue with dilute hydrochloric acid, treating the hydrochloric acid with decolorizing carbon and then making the resulting acidic solution basic with sodium hydroxide liberates 2-methylamino-2-(o-benzyloxyphenyl)-cyclohexanone, whose hydrochloride has M.P. 227–228° C.

If 2 - methylamino-2-(m-benzyloxyphenyl) - cyclohexanone (1.0 g.) is refluxed for 3 hours with 16 ml. of 4 N hydrochloric acid solution and the reaction is worked up as described in paragraph 1 of this example, the resulting product is 2-methylamino-2-(m-hydroxyphenyl)-cyclohexanone.

The 2 - methylamino-2-(m-benzyloxyphenyl)-cyclohexanone used as starting material in this reaction is prepared as follows: m-Benzyloxyphenylcyclopentylketone is brominated to give 1-bromocyclopentyl-(m-benzyloxyphenyl)-ketone. Treatment of the bromoketone with excess liquid methylamine gives 1-hydroxycyclopentyl-(m-benzyloxyphenyl)-ketone N - methylimine. Rearrangement of this iminoalcohol as described in paragraph two of this example gives 2-methylamino-2-(m-benzyloxyphenyl)-cyclohexanone.

*Example 19*

2-methylamino - 2 - (p-methoxyphenyl)-cyclohexanone (5.0 g.) is refluxed in 15 ml. of an acetic acid solution saturated with gaseous hydrobromic acid for 12 hours. The solvent is removed and the residue is put on a strongly basic quaternary ammonium hydroxide ion exchange column. Elution with methanol removes all of the starting material. Subsequent elution with a methanolic solution containing 1% hydrochloric acid gives 2-methylamino - 2 - (p - hydroxyphenyl)-cyclohexanone, M.P. 157–158° C. (decomposition), whose hydrochloride has M.P. 213–214° C. Preparation of the starting material, namely 2-methylamino-2-(p-methoxyphenyl)-cyclohexanone is described in Examples 16 and 17.

I claim:
1. A member of the class consisting of a free base and pharmaceutically acceptable acid- addition salts thereof, said free base having the formula:

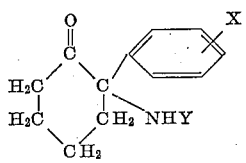

wherein X is selected from the group consisting of hydrogen, chloro, bromo, methyl, methoxy and hydroxy and Y represents a lower alkyl radical containing 1 to 2 carbon atoms inclusive.

2. 2 - methylamino-2-(o-chlorophenyl)-cyclohexanone hydrochloride.
3. 2 - methylamino - 2 - (o-hydroxyphenyl)-cyclohexanone hydrochloride.
4. 2 - methylamino - 2 - (m-hydroxyphenyl)-cyclohexanone hydrochloride.
5. 2 - methylamino - 2 - phenylcyclohexanone hydrochloride.
6. 2-ethylamino-2-phenylcyclohexanone hydrochloride.
7. A process for the production of a compound of the formula:

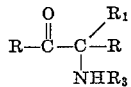

which comprises heating in a sealed vessel at a temperature between 180° and 250° C. for between 10 and 20 hours a member of the group consisting of
(A) A compound of the formula:

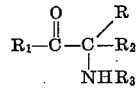

and
(B) The combination of a compound of the formula:
(a)

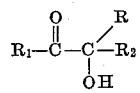

and at least one equivalent of a compound of the formula:
(b)  $R_3NH_2$ wherein R, $R_1$ and $R_2$ are selected from the group consisting of lower alkyl groups containing 1 to 5 carbon atoms inclusive and phenyl groups of the formula:

wherein X is selected from the group consisting of hydrogen, chloro, bromo, lower alkyl containing 1 to 5 carbon atoms, hydroxy, alkoxy containing 1 to 5 carbon atoms and benzyloxy groups and groups wherein any two of R, $R_1$, and $R_2$ may be combined to form an alkylene bridge of from 4 to 5 carbon atoms inclusive and wherein $R_3$ is a lower alkyl group.

8. A process for the preparation of 2-ethylamino-2-phenylcyclohexanone which comprises heating 2-ethylaminophenylcyclopentylketone in a sealed vessel at a temperature of between 180 and 250° C. for between 10 and 20 hours.

9. A process for the preparation of 4-methylamino-4-phenyl-3-hexanone which comprises heating 2-ethyl-2-methylaminobutyrophenone in a sealed vessel at a temperature of between 180 and 250° C. for between 10 and 20 hours.

10. A process for the preparation of 2-methylamino-2-methcylcyclohexanone which comprises heating α-methylaminocyclopentylmethylketone in a sealed vessel at a temperature of between 180° and 250° C. for 10 to 20 hours.

11. A process for the production of α-methylaminophenylcyclohexylketone which comprises heating 2-hydroxy -2-phenylcycloheptanone with at least one equivalent of methylamine in a sealed vessel at a temperature of between 180 and 250° C. for between 10 and 20 hours.

12. A process for the production of 2-methylamino-2-phenylpropiophenone which comprises heating 1,1-diphenyl-1-hydroxy-2-propanone with at least one equivalent of methylamine in a sealed vessel at a temperature of between 180 and 250° C. for between 10 and 20 hours.

References Cited by the Examiner

UNITED STATES PATENTS 3,068,236  12/1962  Krapcho _____ 260—566 X

FOREIGN PATENTS 853,775  11/1960  Great Britain.

OTHER REFERENCES

Julian et al., "Jour. American Chemical Soc.," vol. 67, pages 1203–11 (1945).

Stevens et al., "Jour. Amer. Chem. Soc.," vol. 84, pages 2272–74 (1962).

Takahashi et al., "Chemical Abstracts," vol. 52, pages 10909–14 (1958).

CHARLES B. PARKER, *Primary Examiner.*

ROBERT V. HINES, *Assistant Examiner.*